United States Patent
Lee et al.

(10) Patent No.: US 6,188,723 B1
(45) Date of Patent: Feb. 13, 2001

(54) FINITE IMPULSE RESPONSE FILTER FOR WAVE-SHAPING DIGITAL QUADRATURE AMPLITUDE MODULATION SYMBOLS

(75) Inventors: Jeong Jin Lee; Bong Tae Kim; Min Ho Choi; Hyup Jong Kim, all of Daejeon (KR)

(73) Assignee: Electronics and Telecommunications Research Institute, Daejeon (KR)

(*) Notice: Under 35 U.S.C. 154(b), the term of this patent shall be extended for 0 days.

(21) Appl. No.: 09/112,059

(22) Filed: Jul. 9, 1998

(30) Foreign Application Priority Data

Oct. 13, 1997 (KR) .................................................. 97-52232

(51) Int. Cl.[7] .................................................. H04L 27/01
(52) U.S. Cl. .......................... 375/235; 375/235; 375/350; 708/301; 708/316; 708/319
(58) Field of Search ..................................... 375/229, 235, 375/261, 298, 350; 708/300, 301, 316, 319

(56) References Cited

U.S. PATENT DOCUMENTS

| 5,479,363 | 12/1995 | Willson, Jr. et al. . |
| 5,548,541 | 8/1996 | Bierman et al. . |
| 5,966,314 | * 10/1999 | Lee .................................. 364/724.16 |
| 6,052,701 | * 4/2000 | Koslov et al. ....................... 708/313 |

* cited by examiner

Primary Examiner—Amanda T. Le
(74) Attorney, Agent, or Firm—Jacobson, Price, Holman & Stern, PLLC

(57) ABSTRACT

A finite impulse response (FIR) filter for wave-shaping digital quadrature amplitude modulation (QAM) symbols is disclosed, in which multipliers are replaced with multiplexers, the replaced multiplexers are utilized to receive the symbols directly from a symbol encoder without zero (0) interpolations, and the critical path is reduced by shifting the position of a delay device. The filter includes a first FIR means for delaying the externally inputted symbol data, and for utilizing the delayed symbol data as selection signals to sum up the selected multiplication product (selected from among products obtained by multiplying the symbol values by a pre-set filter tab coefficient) and the selected value selected by a first multiplexing means. A second FIR means delays again the delayed symbol data of the first FIR means, and utilizes the delayed symbol data as selection signals to sum up the selected multiplication product and the output value of the first FIR means.

18 Claims, 6 Drawing Sheets

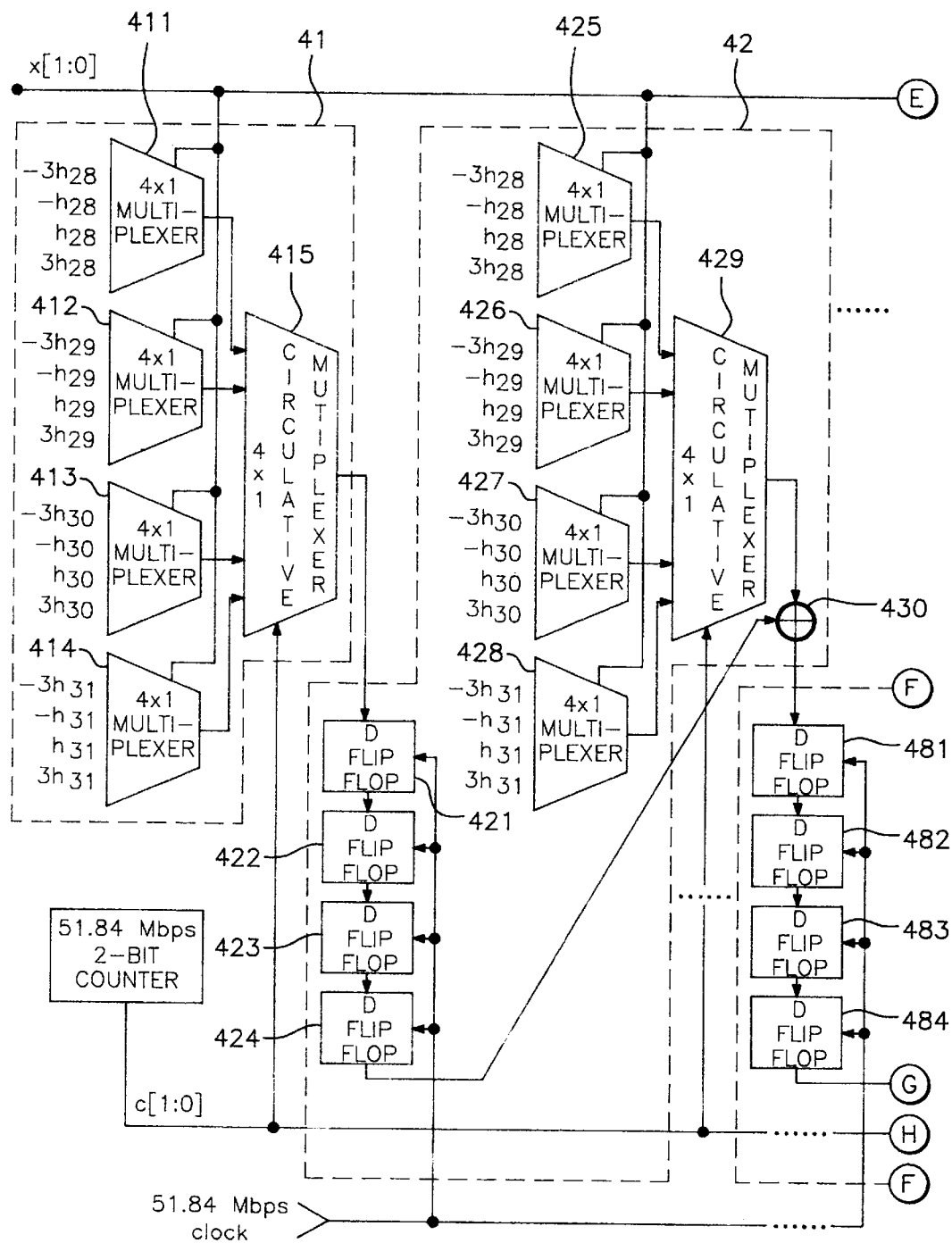

FINITE IMPULSE RESPONSE FILTER FOR WAVE-SHAPING DIGITAL QUADRATURE AMPLITUDE MODULATION SYMBOLS

BACKGROUND OF THE INVENTION

1. Field of the invention

The present invention relates to a finite impulse response (FIR) filter for wave-shaping digital quadrature amplitude modulation (QPM) symbols, in which multipliers are replaced with multiplexers, the replaced multiplexers are utilized to receive the symbols directly from a symbol encoder without zero (0) interpolations, and the critical path is reduced by shifting the positions of delay devices.

2. Description of the prior art

Generally, in the digital $2^k$ QAM method, successive k binary data are encoded into pairs of in-phase quadrature symbols, and are transmitted after wave-shaping, thereby reducing the transmission band into 1/k through the channel.

FIG. 1 is a circuit diagram showing the constitution of the general FIR filter.

The general FIR filter is a wave-shaping FIR filter of a 32-tab digital QAM transmitting section which satisfies the digital QAM 51,84 Mbps downstream transmission standard using symbol values of 1 and 3 of Class B which is recommended in DAVIC 1.2 spec. part 8.

The general FIR filter includes 31 modules (10-n) and a multiplier 104. Each of the modules 10-n includes a D flip flop, a multiplier and an adder. Therefore, the general FIR includes 32 multipliers, 31 adders and 31 D flip flops.

The multiplier 104 internally has a pre-set filter tab coefficient ho, and thus, the inputted symbol value is multiplied by the pre-set filter tab coefficient ho to supply the product to an adder 103 of a first module 10-1.

In the first module 10-1, a D flip flop 101 is used as a delay means to carry out a temporarily storing function. Further, it receives symbol values and clock signals through its input terminal to output one of the inputted symbols through an output terminal. A multiplier 102 multiplies one of the output symbols of the D flip flop 101 by the pre-set filter tab coefficient hl. An adder 103 sums up the output values of the multipliers 102 and 104 to supply the summed value to an adder 103-1 of a second module 10-2.

In the second module 10-2 having the same constitution as that of the first module 10-1, a D flip flop 101-1 serves as a delay device to receive clock signals and the output values of the D flip flop 101 of the first module 10-1 through its input terminal so as to output symbol values through its output terminal. A multiplier 102-1 multiplies one of the output symbol values of the D flip flop 101-1 by a pre-set filter tab coefficient $H_2$. An adder 103-1 sums up the output value of the multiplier 103-1 and the summed value of the adder 103 of the first module 10-1 to supply the summed value to an adder (not illustrated) of a third module (not illustrated).

The third to 31st modules have the same constitution as that of the second module 10-2, and carry out the same operations as that of the second module 10-2. In the 31st module 10-31, the final output values are obtained by multiplying the output symbol value of the D flip flop 101-30 by a filter tab coefficient $h^{31}$ and by summing the summed value of the preceding adder (not illustrated) and the summed value of the adder 103-30.

Now the general FIR filter will be described as to its operations.

The input symbol (x[2:0]) is one of four numbers −3, −1, 1 and 3. One bit among the three bits is used as the code bit of the symbol, while the remaining two are used as the magnitude bits of the symbol.

In the case where the wave shaping filter consists of the general FIR, the FIR filter receives clock signals at a speed of 51.84 Mbps by interpolating three zeros (0) between the respective symbols to solve the problem of the mismatching between the output operating speed (12.96 Mbps) of a symbol encoder (not illustrated) and the input speed (51.84 Mbps) of the wave-shaping filter.

The critical path which represents the longest path from the delay device to the output stage for obtaining one signal requires one multiplier and 31 adders.

Therefore, the conventional general FIR filter has a complicated structure due to the multipliers and adders. Further, due to the difference between the output speed of the symbol encoder and the operating speed of the wave-shaping FIR filter, zeros (0) should be inserted into between the symbols so as to prevent the mixing of the data. Further, in order to obtain one output, a long critical path has to be gone through, with the result that a long time period is consumed in obtaining one output value.

SUMMARY OF THE INVENTION

The present invention is intended to overcome the above described disadvantages of the conventional technique.

Therefore it is an object of the present invention to provide a FIR filter in which multipliers are replaced with multiplexers, the replaced multiplexers are utilized to receive the symbols directly from a symbol encoder without zero (0) interpolations, and the critical path is reduced by shifting the positions of delay devices.

In achieving the above object, the FIR filter according to the present invention includes: a first multiplexing means for receiving input symbol data as selection signals to select one value from among products obtained by multiplying symbol values by a pre-set filter tab coefficient; a first FIR means for delaying the externally inputted symbol data, and for utilizing the delayed symbol data as selection signals to sum up the selected multiplication product (selected from among products obtained by multiplying symbol values by a pre-set filter tab coefficient) and the selected value selected by the first multiplexing means; and a second FIR means for delaying again the delayed symbol data of the first FIR means, and for utilizing the delayed symbol data as selection signals to sum up the selected multiplication product and the output value of the first FIR means.

In another aspect of the present invention, the FIR filter according to the present invention includes: a first FIR means for circulatively outputting products obtained by multiplying respective symbol values by filter tab coefficients in accordance with count signals (the multiplications being carried out in accordance with the sequence of the inputted symbol data), to match an input operation speed to an output operating speed during a symbol period even without insertions of zeros (0); a second FIR means for delaying the externally inputted symbol data to sum up the circulatively outputted values of products obtained by multiplying symbol values by filter tab coefficients in accordance with the count signals (the multiplications being carried out in accordance with the sequence of the inputted symbol data) and the output values of the first FIR means, based on the delayed symbol data; and a third FIR means for summing up the circulatively outputted values of products outputted in accordance with the count signals and obtained by multiplying symbol values (delayed by the second FIR means) by filter tab coefficients, and the output values of the second FIR means.

In still another aspect of the present invention, the FIR filter according to the present invention includes: a first FIR means for circulatively outputting products obtained by multiplying respective symbol values by filter tab coefficients in accordance with count signals (the multiplications being carried out in accordance with the sequence of the inputted symbol data), to match an input operation speed to an output operating speed during a symbol period even without insertions of zeros (0); and at least one second FIR means for sequentially storing the output values of the first FIR means, to sum up the sequentially outputted values and the circulatively outputted values of the products obtained by multiplying the symbol values by filter tab coefficients in accordance with the externally inputted symbol data, the circulative outputting being done in accordance with the count signals, whereby a critical path is reduced.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENTS

The preferred embodiments of the present invention will be described in detail referring to FIGS. 2 to 4.

Figure 1:
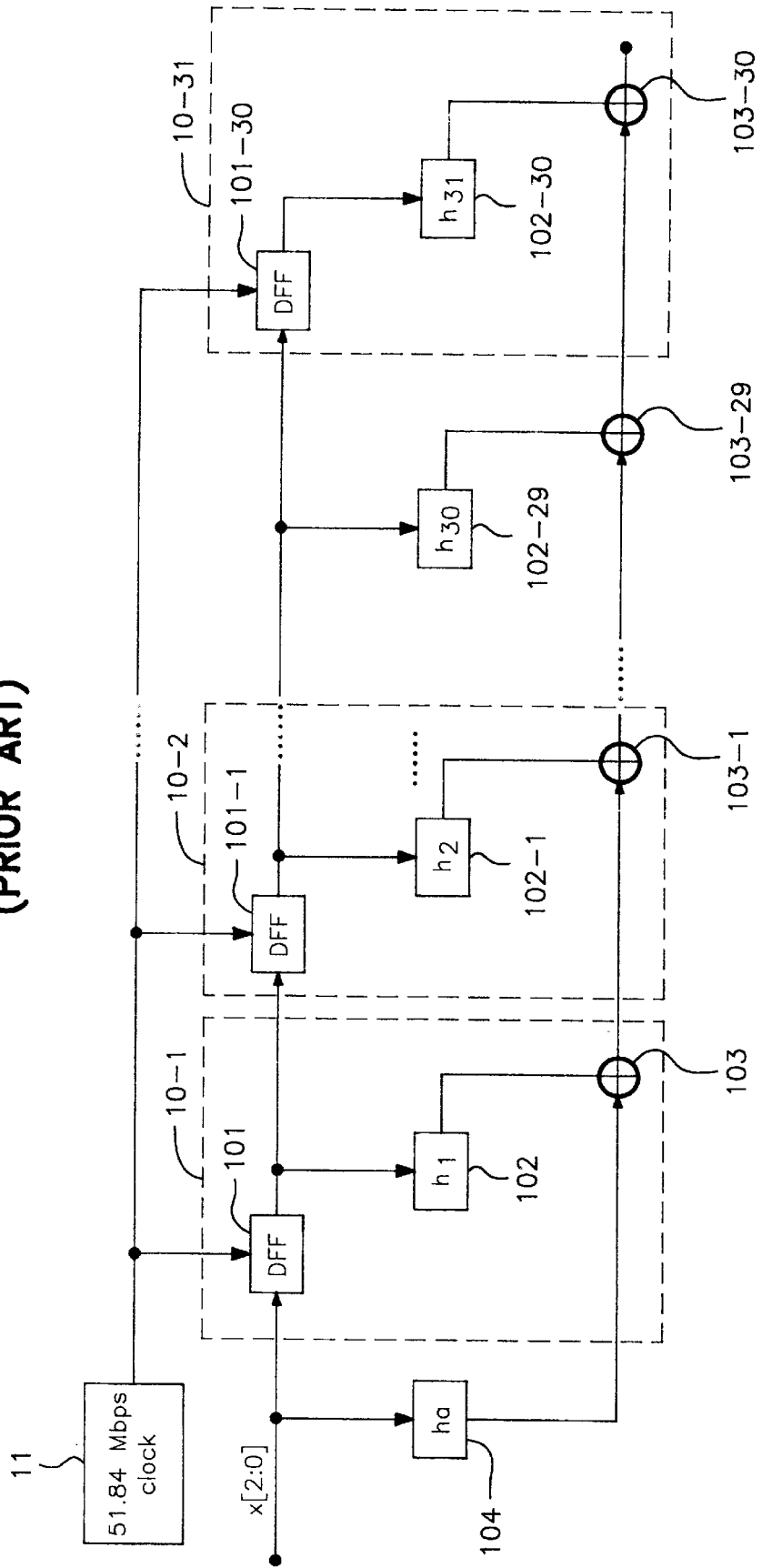
FIG. 1 is a circuit diagram showing the constitution of the general FIR filter.
Figure 2:
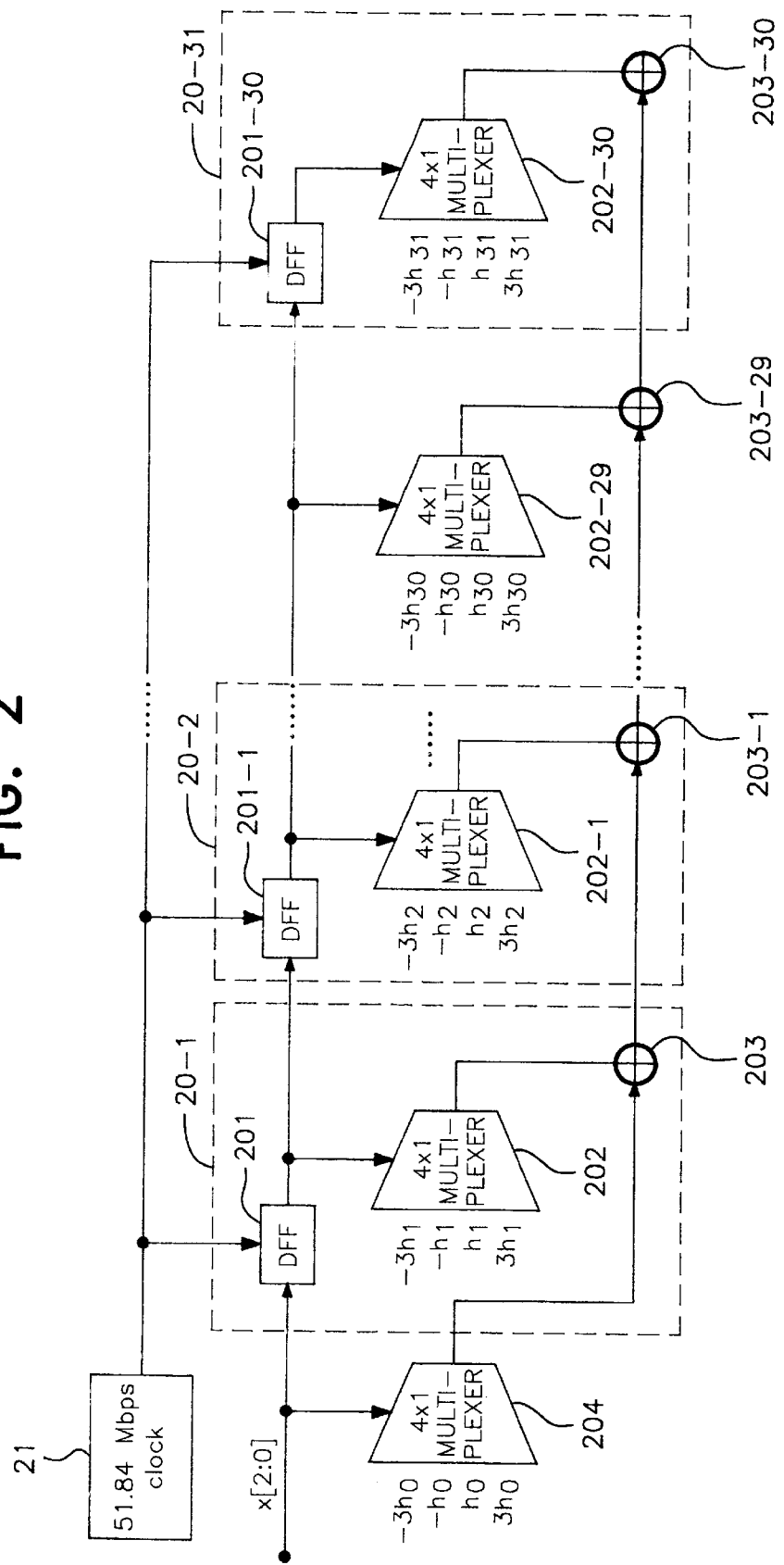
FIG. 2 illustrates an embodiment of the FIR filter of the present invention in which the multipliers are replaced with multiplexers.

FIG. 2 illustrates an embodiment of the FIR filter of the present invention in which the multipliers are replaced with multiplexers.

In the first embodiment of the FIR filter according to the present invention, the multipliers of the conventional FIR filter are replaced with multiplexers.

A 16-QAM symbol consists of in-phase quadrature pairs having a value of −3, −1, 1 and 3. That is, the input value for the wave-shaping filter is one of the above four values, and therefore, this value multiplied by a filter tab coefficient is calculated in advance to set the multiplied product on a 4*1 multiplexer.

Therefore, there are included 31 FIR modules (20-1 to 20-31) and one 4*1 multiplexer 204. Each of the FIR modules (20-1 to 20-31) includes a D flip flop, a 4*1 multiplexer, and an adder.

The 4*1 multiplexer 204 receives 3-bit input data as selection signals, and selects one of the products (−3ho, −1ho, 1ho and 3ho) obtained by multiplying one of the symbol values −3, −1, 1 and 3 by a pre-set filter tab coefficient, to supply the value to an adder 203 of a first FIR module 20-1. That is, if the input data are inputted in the form of −3, −1, 1 and 3, the values −3ho, −1ho, 1ho and 3ho are selected by the 4*1 multiplexer 204. If values other than 3 and 1 are inputted, then it is assumed that a zero interpolation is done. Therefore, in this case, 0 is outputted.

In the first FIR module 20-1, the D flip flop 201 functions as a delay device to carry out a temporary storing, and receives the symbol values and clock signals of 51.84 Mbps to output one of the input symbol values through an output terminal. The 4*1 multiplexer 202 receives the output value of the D flip flop 201 as a selection signal, and selects one of the products (−3h1, −1h1, 1h1 and 3h1) obtained by multiplying the symbol values of −3, −1, 1 and 3 by a pre-set filter tab coefficient h1 to supply it to the adder 203. The adder 203 sums up the respective output values of the 4*1 multiplexers 202 and 204 to supply the summed value to an adder 204 of a second FIR module 20-2.

In the second FIR module 20-2 which has the same constitution as that of the first FIR module 20-1, a D flip flop 201-1 serves as a delay device and receives clock signals and the output values of the D flip flop 201 of the first FIR module 20-1 to output an output value through an output terminal. A 4*1 multiplexer 202-1 receives the output values of the D flip flop 201-1, and selects one of products −3h2, 1h2, −1h2 and 3h2 obtained by multiplying the symbol values of −3, −1, 1 and 3 by a pre-set filter tab coefficient h2 like the 4*1 multiplexer 204 to supply it to an adder 203-1. The adder 203-1 sums up the output value of the 4*1 multiplexer 202-1, and the summed value of the adder 203 of the first FIR module 20-1 to supply the summed value to an adder (not illustrated) of a third FIR module (not illustrated).

The third to 31st FIR modules 20-3 to 20-31 has constitutions same as that of the second FIR module 20-2, and operates in the same manner as the second FIR module 20-2. In the 31st FIR module 20-31, the output of a D flip flop 201-30 is received as a selection signal, and one of products obtained by multiplying the symbol values −3, −1, 1 and 3 by a filter tab coefficient h31 is selected like in the 4*1 multiplexer 204. This selected value and the output of an adder 203-29 of the preceding FIR module (not illustrated) are summed up by an adder 203-30, and this summed value becomes the final output.

Now this first embodiment of the present invention in which the multipliers are replaced with multiplexers will be described as to its operations.

The inputted symbols are −3, −1, 1, 3 and interpolated zeros always, and therefore, the filter tab coefficient value hn and the symbol values are calculated in advance to store them in the 4*1 multiplexer. Then the two bits of the symbol input signals (x[2:0]) are used as control signals, while the remaining one bit is used for discriminating the interpolated zero.

Thus in this embodiment, the FIR filter calculates the symbol values in advance to store them, and therefore, the calculation speed is faster than the conventional FIR filter. Further, compared with the case of using the multipliers, a smaller number of gates are required, and therefore, the occupation area of the hardware is reduced.

Figure 3:
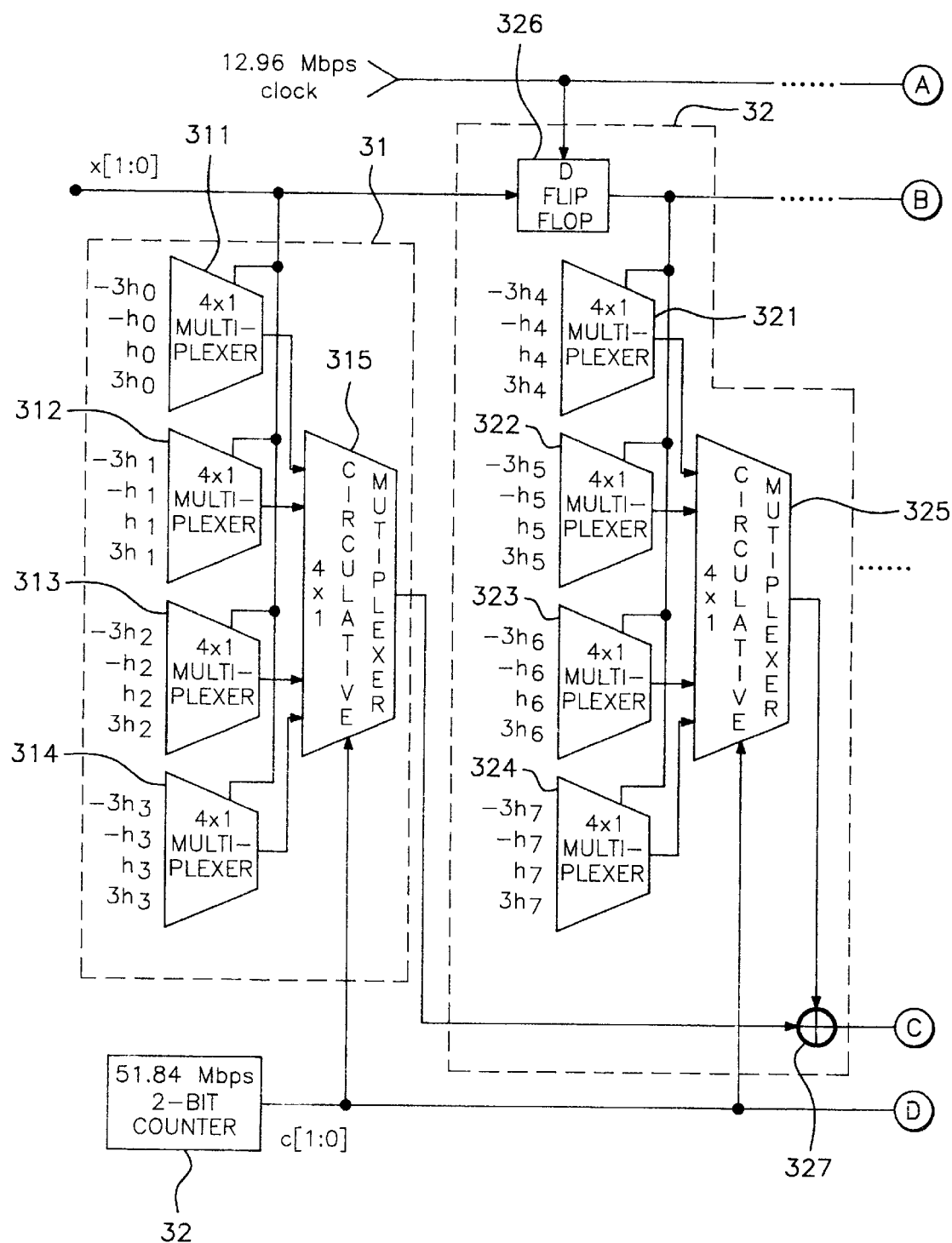
FIG. 3 illustrates another embodiment of the FIR filter of the present invention in which the symbols are directly received from the symbol encoder without zero interpolations.
Figure 3A:
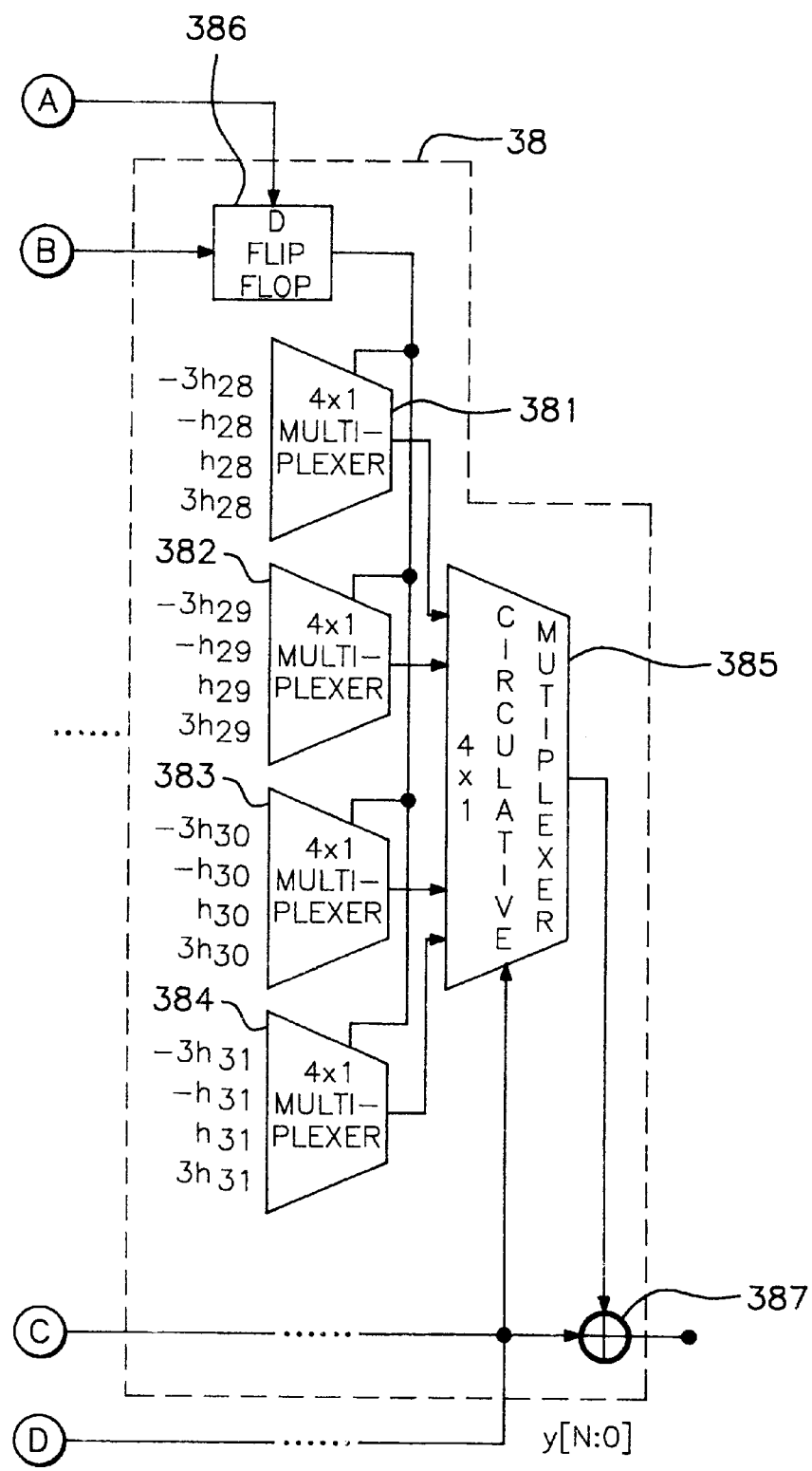

FIG. 3 illustrates another embodiment of the FIR filter of the present invention in which the symbols are directly received from the symbol encoder without zero interpolations.

In this embodiment, the multipliers are replaced with multiplexers, and these are arranged in parallel to each other, so that outputs can be outputted in a circulative manner. Since a plurality of the multiplexers are connected in parallel to each other, the number of the delay devices for temporarily storing the values can be reduced.

Here an effect is produced as if the insertion of 3 zeros into between the symbols of the conventional FIR filter is realized. For this purpose, the outputs of the adjacent four 4*1 multiplexers are circulatively outputted, thereby forming a single circulative 4*1 multiplexer.

In this embodiment, the FIR filter includes eight FIR modules 31–38. A first FIR module 31 includes four 4*1 multiplexers 311-314 and one 4*1 circulative multiplexer 315. The second to eighth FIR modules 32-38 each includes four 4*1 multiplexers, a D flip flop, an adder and a 4*1 circulative multiplexer.

In the first FIR module 31, the 4*1 multiplexer 311 receives 2-bit input data as a selection signal, and selects one of products −3ho, −1ho, 1ho and 3ho obtained by multiplying the symbol values −3, −1, 1 and 3 by a pre-set filter tab coefficient ho. That Ls, the 2-bit input data can be expressed by 00, 01, 10 and 11. If the input data is 00, −3ho is selected. If the input data is 01, −1ho is selected. If the input data is 10, 1ho is selected. If the input data is 11, 3ho is selected by the 4*1 multiplexer 311.

In the above described manner, each of the 4*1 multiplexers 312–314 selects one of products obtained by multiplying the symbol values of 3 and 1 by a filter tab coefficient to supply it to the 4*1 circulative multiplexer 315. The 4*1 circulative multiplexer 315 receives the 2-bit count of 51.84 Mbps as selection signals, and selects one of the selected data values of the 4*1 multiplexers 312–314 to supply it to an adder 327 of the second FIR module.

In a second FIR module 32, the D flip flop 326 serves as a delay device to temporarily store data signals, and receives one of the input symbol values and the clock signals of 12.96 Mbps to store them. Then it supplies them as selection signals to the 4*1 multiplexers 321–324 which have the same constitution as those of the first FIR module 31. The adder 327 sums up the output values of the 4*1 circulative multiplexers 315 and 325 of the first and second FIR modules 31 and 32. Then the adder 327 supplies the summed value to an adder (not illustrated) of a third FIR module (not illustrated).

Third to eighth FIR modules 33–38 have the same constitutions as that of the second FIR module 32 and operates in the same manner. However, the difference is that each of the adders sums up the summed value of the adder of the preceding FIR module and the value supplied to the 4*1 circulative multiplexer.

Finally, the summed output value of an adder 387 of an eighth FIR module 38 becomes the final output value.

Now the second embodiment of the FIR filter of the present invention in which the symbols are directly received from the symbol encoder without zero interpolations will be described as its operations.

In a state with the input operation speed and the symbol encoder output operation speed matched to 12.96 Mbps, what gives the effect of realizing actual multiplications between the input symbol data (. . . 3000–100010 . . .) without zero interpolations is the symbol value which is inputted at every four times. The remaining zeros give a result as if they are multiplied by the same symbol value only by changing the three adjacent tab coefficients.

In this FIR filter, the symbol values are directly received without zero interpolations. Then within a single symbol period, the outputs of the adjacent four multiplexers are circulatively sent, and thus the clock signals of 51.84 Mbps can be made to act as clock signals of 12.96 Mbps which is the symbol speed. Further, the numbers of the adders and D flip flops can be reduced to ¼ compared with the conventional FIR filter. Therefore, eight 4*1 circulative multiplexers are additionally required, so that the outputs of the 32 multiplexers connected in parallel by 4 can be circulated.

In this second embodiment of the FIR filter according to the present invention, the number of the adders are reduced, and the multipliers are replaced with multiplexers. Therefore, the number of the gates is reduced, the calculation speed is made faster, and the complication of the hardware is simplified. Further, the symbol output speed of the symbol encoder is matched to the operation speed of the FIR filter, and therefore, the mixing of the data can be prevented even without zero interpolations.

Figure 4A:
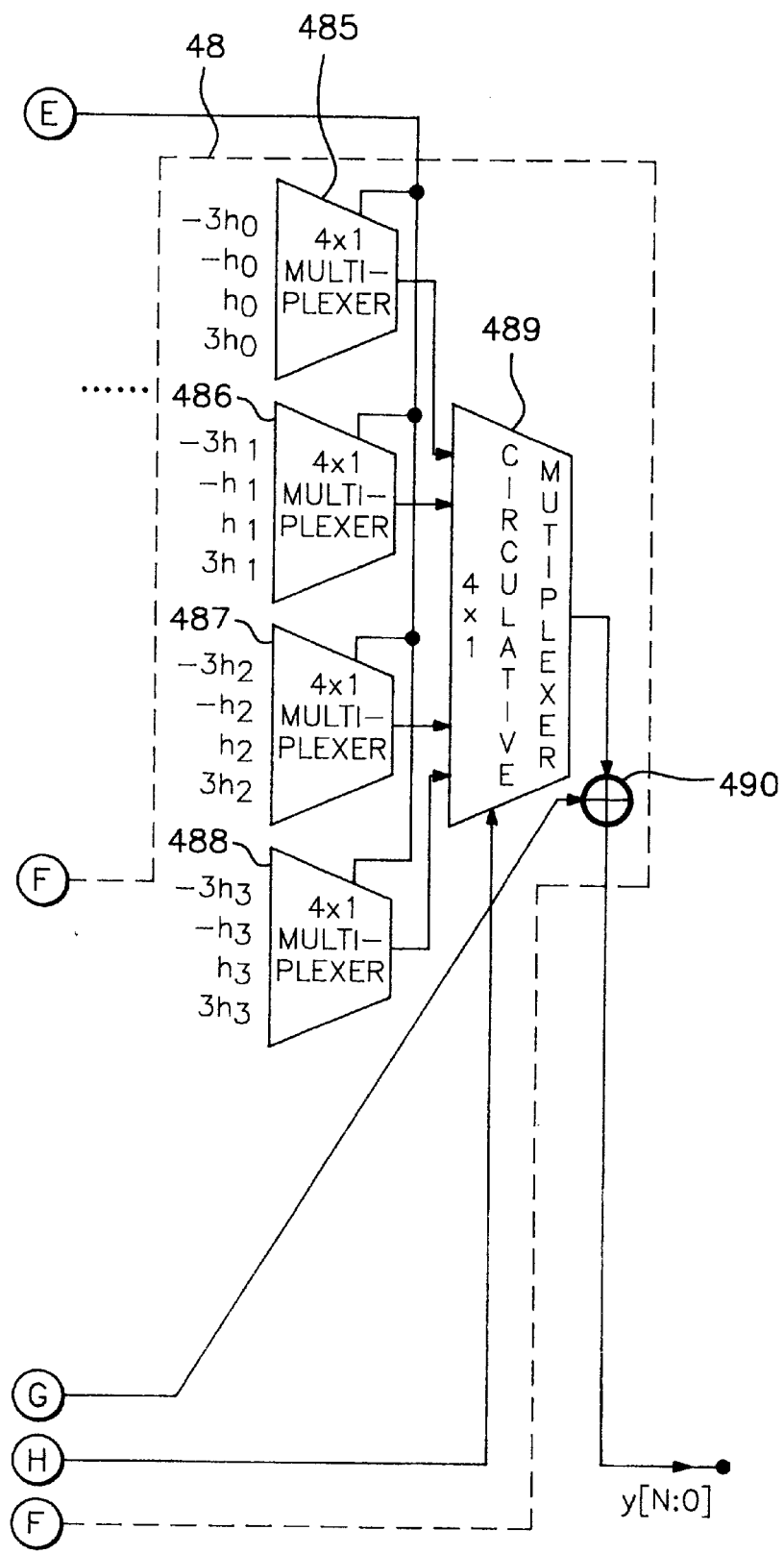
FIG. 4 illustrates still another embodiment of the FIR filter according to the present invention.

FIG. 4 illustrates still another embodiment of the FIR filter according to the present invention.

In this third embodiment of the FIR filter according to the present invention, the multipliers of the conventional FIR filter are replaced with multiplexers, and these multiplexers are connected in parallel to form circulative multiplexers. Therefore, the symbols are directly received without zero interpolations, and a plurality of serially connected delay devices are formed to sequentially store the data, thereby reducing the critical path.

This FIR filter includes eight FIR modules 41–48. A first FIR module 41 includes four 4*1 multiplexers 411–414 and one 4*1 circulative multiplexer 415. Second to eighth FIR modules 42–48 each includes: four D flip flops, four 4*1 multiplexers, an adder and a 4*1 circulative multiplexer for circulating the outputs of the four 4*1 multiplexers.

The first FIR module 41 has the same constitution as that of the first FIR module 31 of FIG. 3, and operates in the same manner. Therefore, the 4*1 multiplexer 411 receives 2-bit input data as a selection signal, and selects one of products −3h28, −1h28, 1h28 and 3h28 obtained by multiplying the symbol values −3, −1, 1 and 3 by a pre-set filter tab coefficient h28. That is, the 2-bit input data can be expressed by 00, 01, 10 and 11. If the input data is 00, then −3h28 is selected. If the input data is 01, then −1h28 is selected. If the input data is 10, then 1h28 is selected. If the input data is 11, then 3h28 is selected by the 4*1 multiplexer 311.

In the above described manner, each of the 4*1 multiplexers 412–414 selects one of products obtained by multiplying the symbol values of 3 and 1 by a filter tab coefficient to supply it to the 4*1 circulative multiplexer 415. The 4*1 circulative multiplexer 415 receives the 2-bit count of 51.84 Mbps as selection signals, and selects one of the selected data values of the 4*1 multiplexers 411–414 to supply it to a D flip flop 421 of the second FIR module 42.

In the second FIR module 42, D flip flops 421–424 which are serially connected for preventing the mixing of the symbol data serve as delay devices to temporarily store the data. Further, they receive the selected output value of the 4*1 circulative multiplexer 415 of the first FIR module 41 and the clock signals of 51.85 Mbps to temporarily store them so as to supply them to a next D flip flop. The output of a final D flip flop 424 is supplied to an adder 430 of the second FIR module 42. Then the adder 430 sums up the final output value of the delay device 424 and the output value of the 4*1 circulative multiplexer 429, this last value being selected in the same manner as that of the 4*1 circulative multiplexer 415 of the first FIR module 41.

Third to eighth FIR modules 43–48 have the same constitutions as that of the second FIR module 42 and operates in the same manner. Finally, the summed output value of an adder 490 of an eighth FIR module 48 becomes the final output value.

This third embodiment of the FIR filter according to the present invention will now be described as to its operations.

The respective FIR modules 41–48 receive 2-bit symbol values (−3, −1, 1 and 3) at a speed of 12.84 Mbps to utilize these signals as selection signals for the 4*1 multiplexers of the FIR modules 41–48. Thus four output values which have been calculated during one symbol period are sequentially outputted through the respective 4*1 circulative multiplexers.

For example, if the inputted 2-bit symbol values are 00, 01, 10 and 11, then the 32 4*1 multiplexers output −3hn, −1hn, 1hn and 3hn, while the eight 4*1 circulative multiplexers sequentially output the output values of the 4*1 multiplexers. Then filtering are carried out moving step by step toward the last D flip flop. Accordingly, the critical path for obtaining one output value of 51.84 Mbps is reduced to one of multiplexers 485–488 (for outputting the selected value), a circulative multiplexer 489 and an adder 490.

In order to carry out the calculation of the tab coefficient of the FIR filter, if the calculation order is changed, and if the delay device is moved to the lower stage, then the critical path for outputting one data is reduced to two 4*1 multiplexers and one adder.

If the data are to be outputted at a speed of 51.84 Mbps, the calculations have to be completed at a speed of 19 ns before sending the output data. That is, for one output data, the data signals have to pass through two 4*1 multiplexers and seven adders within 19 ns. Therefore, during a high speed processing, the internal calculations may impose a delay problem.

In this third embodiment of the FIR filter, one 51.84 Mbps unit delay device is disposed in parallel with four 12.96 Mbps unit delay devices, so that four in-process data can be parallelly calculated within one symbol period. These calculated values are stored for using them at the next symbol period.

When embodying an actual system, the most serious problem is the critical path. In the present invention, when embodying the actual digital circuit, the number of the adders is reduced, and the multipliers are replaced with multiplexers. Thus in the overall view, the number of the gates is reduced, so that the calculation speed can be promoted, and that the hardware complication can be simplified. Further, the difference of the operation speed between the symbol output speed and the operation speed of the wave-shaping FIR filter is eliminated, so that the zero interpolations would be needless. Further, the positions of the delay devices are shifted, with the result that the critical path for calculating one output sample is reduced to two multiplexers and one adder.

In the above, the present invention was described based on the specific drawings, but it should be apparent to those ordinarily skilled in the art that various changes and modifications can be added without departing from the spirit and scope of the present invention as defined in the appended claims.

According to the present invention as described above, when it is used as a wave-shaping filter, the multipliers are replaced with multiplexers, so that the hardware complexity can be simplified. Further, the critical path is minimized without zero interpolations by matching the speed of the symbol encoder to that of the wave-shaping filter by using circulative multiplexers.

What is claimed is:

1. An FIR (finite impulse response) filter comprising:

a first multiplexing means for receiving input symbol data as selection signals to select a first multiplication product from among products obtained by multiplying symbol values by a pre-set filter tab coefficient;

a first FIR means for delaying the input symbol data, and for utilizing the delayed symbol data as the selection signals to sum up a second multiplication product selected from among the products and the first multiplication product; and at least one second FIR mans for delaying again the delayed symbol data of said first FIR means, and for utilizing the twice delayed symbol data as the selection signals to sum up a third multiplication product selected from among the products and an output value of said first FIR means.

2. The FIR filter as claimed in claim 1, wherein said first FIR means comprises:

a first delay means for receiving the input symbol data and clock signals from a clock generator, for delaying the symbol data and outputting them through an output terminal;

a second multiplexing means for selecting one of products obtained by multiplying symbol values by the pre-set filter tab coefficient by using the delayed symbol data of said first delay means as the selection signals; and a first adding means for summing up the selected value of said first multiplexing means and the selected value of said second multiplexing means.

3. The FIR filter as claimed in claim 2, wherein said second FIR means comprises:

a second delay means for receiving the delayed symbol data from said first delay means and clock signals from said clock generator, to delay the delayed symbol data and to output them through and output terminal;

a third multiplexing means for selecting one of products obtained by multiplying symbol values by the pre-set filter tab coefficient by using the delayed symbol data of said second delay mans as the selection signals; and a second adding means for summing up the selected value of said first adding means and the selected value of said third multiplexing means.

4. The FIR filter as claimed in claim 1, wherein said second FIR means comprises:

a second delay means for receiving the delayed symbol data from said first delay means and clock signals from said clock generator, to delay the symbol data and to output them through an output terminal;

a third multiplexing means for selecting one of products obtained by multiplying symbol values by the pre-set filter tab coefficient by using the delayed symbol data of said second delay means as selection signals; and a second adding means for summing up the selected value of said first adding means and the selected value of said third multiplexing means.

5. The FIR filter as claimed in claim 4, wherein said first and second delay means comprise D flip flops.

6. An FIR (finite impulse response) filter comprising:

a first FIR means for circulatively outputting products obtained by multiplying respective symbol values by filter tab coefficients in accordance with count signals (the multiplications being carried out in accordance with a sequence of input symbol data), to match an input operation speed to an output operating speed during a symbol period even without insertions of zeros(0);

a second FIR means for delaying the input symbol data to sum up circulatively outputted values of products obtained by multiplying symbol values by the filter tab coefficients in accordance with count signals (the multiplications being carried out in accordance with a sequence of the input symbol data) and the output values of said first FIR means, based on the delayed symbol data; and a third FIR means for summing up circulatively outputted values of products outputted in accordance with count signals and obtained by multiplying symbol values delayed by said second FIR means by the filter tab coefficients, and the output values of said second FIR means.

7. The FIR filter as claimed in claim 6, wherein said first FIR means comprises:

a plurality of parallelly connected first multiplexing means for selecting one of products obtained by multiplying symbol values by a pre-set filter tab coefficient by using an input symbol data as selection signals; and a first circulative multiplexing means for circulatively outputting respective outputs of the plurality of said parallelly connected first multiplexing means in accordance with count signals.

8. The FIR filter as claimed in claim 7, wherein said second FIR means comprises:

a first delay means for receiving symbol data from outside and clock signals from a clock generator, for delaying the symbol data and for outputting them through an output terminal;

a plurality of parallelly connected second multiplexing means for selecting one of products obtained by multiplying symbol values by the pre-set filter tab coefficient by using the delayed symbol data of said first delay means as selection signals;

a second circulative multiplexing means for circulatively outputting respective outputs of the plurality of said parallelly connected second multiplexing means in accordance with count signals; and a first adding means for summing up the selected value of said first circulative multiplexing means and the selected value of said second circulative multiplexing means.

9. The FIR filter as claimed in claim 5, wherein said second FIR means comprises:

a first delay means for receiving symbol data from outside and clock signals from a clock generator, for delaying the symbol data and for outputting them through an output terminal;

a plurality of parallelly connected second multiplexing means for selecting one of products obtained by multiplying symbol values by the pre-set filter tab coefficient by using the delayed symbol data of said first delay means as selection signals;

a second circulative multiplexing means for circulatively outputting respective outputs of the plurality of said parallelly connected second multiplexing means in accordance with count signals; and a first adding means for summing up the selected value of said first circulative multiplexing means and the selected value of said second circulative multiplexing means.

10. The FIR filter as claimed in claim 9, wherein said third FIR means comprises:

a second delay means for receiving the delayed symbol data from said first delay means and clock signals from said clock generator, to delay the symbol data and to output them through an output terminal;

a plurality of parallelly connected third multiplexing means each for selecting one of products obtained by multiplying symbol values by a pre-set filter tab coefficient by using the delayed symbol data of said second delay means as selection signals;

a third circulative multiplexing means for circulatively outputting respective outputs of the plurality of said parallelly connected third multiplexing means in accordance with count signals; and a second adding means for summing up the selected value of said first adding means and the selected value of said second circulative multiplexing means.

11. The FIR filter as claimed in claim 10, wherein said first and second delay means comprise D flip flops.

12. An FIR (finite impulse response) filter comprising:

a first FIR means for circulatively outputting products obtained by multiplying respective symbol values by filter tab coefficients in accordance with count signals (the multiplications being carried out in accordance with a sequence of inputted symbol data), to match an input operation speed to an output operating speed during a symbol period even without insertions of zeros (0); and at least one second FIR means for sequentially storing the output values of said first FIR means, to sum up the sequentially outputted values and circulatively outputted values of the products obtained by multiplying the symbol values by a filter tab coefficient in accordance with input symbol data, the circulative outputting being done in accordance with count signals, whereby a critical path is reduced.

13. The FIR filter as claimed in claim 12, wherein said first FIR means comprises:

a plurality of parallelly connected first multiplexing means for selecting one of products obtained by multiplying symbol values by a pre-set filter tab coefficient by using an input symbol data as the selection signals; and a first circulative multiplexing means for circulatively outputting the respective outputs of the plurality of said parallelly connected first multiplexing means in accordance with count signals.

14. The FIR filter as claimed in claim 12, wherein said second FIR means comprises:

a plurality of serially connected delay means for calculating in-process data selected by said first circulative multiplexing means in a parallel manner, to sequentially store them so as to use them at a next symbol period;

a plurality of parallelly connected second multiplexing means for receiving input symbol data as the selection signals, and for selecting one of products obtained by multiplying symbol values by the pre-set filter tab coefficient;

a second circulative multiplexing means for circulatively outputting the respective outputs of the plurality of said parallelly connected second multiplexing means in accordance with count signals; and an adding means for summing up the selected values of said delay means and said second circulative multiplexing means.

15. The FIR filter as claimed in claim 14, wherein said critical path comprises two multiplexing means and one adding means.

16. The FIR filter as claimed in claim 13, wherein said input symbol values consist of 3 and 1.

17. The FIR filter as claimed in claim 14, wherein said delay means comprises D flip flops.

18. The FIR filter as claimed in claim 10, wherein said second FIR means comprises:

- a plurality of serially connected delay means for calculating in-process data selected by said first circulative multiplexing means in a parallel manner, to sequentially store them so as to use them at a next symbol period;
- a plurality of parallelly connected second multiplexing means for receiving input symbol data as the selection signals, and for selecting one of products obtained by multiplying symbol values by the pre-set filter tab coefficient;
- a second circulative multiplexing means for circulatively outputting the respective outputs of the plurality of said parallelly connected second multiplexing means in accordance with count signals; and
- an adding means for summing up the selected values of said delay means and said second circulative multiplexing means.

* * * * *